Patented July 25, 1950

2,516,673

UNITED STATES PATENT OFFICE 2,516,673

3,5-SUBSTITUTED 4,6-DIMETHYL-2-PYRIDONES

William F. Bruce, Havertown, Pa., assignor to Wyeth Incorporated, Philadelphia, Pa., a corporation of Delaware No Drawing. Application August 28, 1947, Serial No. 771,145

5 Claims. (Cl. 260—295.5)

This invention pertains to 3,5-substituted 4,6-dimethyl-2-pyridones. Important compounds of this group may be represented by the generic formula:

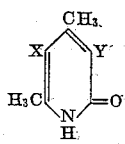

wherein X is a halogen other than fluorine, and Y is a —$CONH_2$ or —$CH_2NH_2$ group. In other important compounds of this group X is the amino group $NH_2$.

This application is a continuation-in-part of my copending application Serial No. 586,440, filed April 3, 1945, now abandoned.

The invention comprises the compounds and the steps and sequence of steps and features of synthesis which will be exemplified in the processes and products hereinafter described.

In vitamin investigations numerous compounds which do not occur in nature have been found to exhibit $B_6$ (pyridoxine) activity. These compounds are synthetic pyridine derivatives of considerable potential physiological and chemical importance.

The compounds of the present invention are of value in this field since they furnish useful starting points for numerous syntheses by appropriate reactions of their substituent groups—e. g. halogen can be replaced by —$NH_2$ or —OH, nuclear oxygen (=O or —OH) can be replaced by halogen, and —$NH_2$ can be replaced by OH.

The following examples are intended to be illustrative but not to limit my invention, the scope of which is defined in the appended claims.

EXAMPLE I

*Preparation of 3-carboxamido-5-bromo-4,6-dimethyl-2-pyridone*

19 g. (0.1 mol) of 3-carboxamido-4,6-dimethyl-2-pyridone was dissolved in 200 cc. of glacial acetic acid and the solution was heated to 70° C. Bromine was added to the solution until the permanent color of the solution indicated an excess of bromine. The solution was poured into 300 cc. of cold water and treated with enough ammonium hydroxide to decolorize it. The precipitated 5-bromo compound was filtered off and recrystallized from hot 60% alcohol. The yield of product amounted to 21 g. which is equal to 86% of the theoretical yield. The 3-carboxamido-5-bromo-4,6-dimethyl-2-pyridone crystallizes in fine white needles which are slightly soluble in water, soluble in hot 60% alcohol and melt with decomposition at 325° C.

Analysis:
Calculated for: $C_8H_9O_2N_2Br$ _____ 39.20% C   3.71% H
Found _____ 39.98%     3.69%

EXAMPLE II

*Preparation of 3-aminomethyl-5-bromo-4,6-dimethyl-2-pyridone*

15 g. (0.1 mol) of 3-aminomethyl-4,6-dimethyl-2-pyridone in 200 cc. of glacial acetic acid were treated with an excess of bromine. The solution was poured into 250 cc. of cold water and enough ammonium hydroxide was added to make the solution slightly alkaline to litmus. The precipitated bromo compound was filtered off and recrystallized from alcohol to give 19 g. or 83% of the theoretical yield of 3-aminomethyl-5-bromo-4,6-dimethyl-2-pyridone.

Analysis:
Calculated for: $C_8H_{11}BrN_2O$ _____ 41.57% C   4.80% H
Found _____ 41.89%     5.13%

EXAMPLE III

*Preparation of 3-aminomethyl-5-amino-4,6-dimethyl-2-pyridone*

74 g. (0.5 mol) of 3-cyano-4,6-dimethyl-2-pyridone was added to 300 cc. of acetic anhydride and cooled in an ice bath. The resulting mixture was treated with 44 cc. of fuming nitric acid in 40 cc. of acetic anhydride with a little urea. The solid gradually dissolved as the mixture evolved heat. The temperature of the reaction was not allowed to become higher than 50° C. After the addition of the fuming nitric acid, the mixture was allowed to stand until no further heat of the reaction was noticeable. The mixture was poured onto ice and crystallization took place immediately. The 5-nitro compound was filtered off and purified by dissolving in a dilute aqueous ammonium hydroxide and precipitating with hydrochloric acid. The yield of the product amounted to 69 g., equal to 70% of the theoretical yield. The 3-cyano-5-nitro-4,6-dimethyl-2-pyridone is a pale yellow micro-crystalline powder very slightly soluble in alcohol, slightly soluble in water and very soluble in aqueous ammonia and melts at 280 to 281° C.

Analysis:
Calculated for: $C_8H_7O_3N_3$ _____ 49.74% C   3.66% H
Found _____ 50.47%     3.84%

19 g. (0.1 mol) of 3-cyano-5-nitro-4,6-dimethyl-2-pyridone was dissolved in 500 cc. of alcohol. One gram of platinum oxide was added to the solution and hydrogen was passed into the solution with shaking. After five hours, the compound had taken up 5 mols of hydrogen and the hydrogenation was stopped. The solution was filtered from the catalyst after which it was concentrated to a volume of 150 cc. under reduced pressure and placed in the icebox for several hours. The precipitated product was filtered off and recrystallized from alcohol. The filtrate was further concentrated and the additional product thus obtained was filtered off and recrystallized. The yield of product amounted to 11 g. which is equal to 70% of the theoretical yield. The 3-aminomethyl - 5-amino-4,6-dimethyl-2-pyridone is a fluffy light yellow cotton-like crystalline solid which is soluble in alcohol and ethyl acetate and melts at 323° to 324° C. The compound exhibits a strong greenish fluorescence in alcohol and water.

Analysis:
Calculated for: $C_8H_{13}ON_3$ ---- 57.46%C   7.83%H
Found ---- 58.90%   5.19%

The corresponding 5-iodo and 5-chloro derivatives of 3-aminomethyl- and 3-carboxamido-4,6-dimethyl-2-pyridone may be prepared in a similar manner if an iodinating or chlorinating agent is substituted respectively for the bromine, as shown in Examples I and II.

I claim:
1. Compounds of the generic formula:

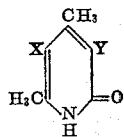

wherein X is a halogen other than fluorine, while Y is a carbon- and nitrogen-containing substituent in which the nitrogen is directly connected to the carbon selected from the group consisting of —$CONH_2$, and —$CH_2NH_2$.

2. 3 - carboxamido - 5-bromo-4,6-dimethyl-2-pyridone.

3. 3 - aminomethyl - 5-bromo-4,6-dimethyl-2-pyridone.

4. 3 - carboxamido - 5 - halo-4,6-dimethyl-2-pyridone, the halogen in the 5 position being a halogen other than fluorine.

5. 3 - aminomethyl - 5 - halo-4,6-dimethyl-2-pyridone, the halogen in the 5 position being a halogen other than fluorine.

WILLIAM F. BRUCE.

REFERENCES CITED

The following references are of record in the file of this patent:

UNITED STATES PATENTS

| Number | Name | Date |
|---|---|---|
| 2,266,754 | Harris | Dec. 23, 1941 |
| 2,310,167 | Carlson | Feb. 2, 1943 |
| 2,371,694 | Kuhn | Mar. 20, 1945 |
| 2,410,531 | Szabo | Nov. 5, 1946 |

OTHER REFERENCES

Moir Chem. Soc. Journal (1902) vol. 81, p. 1, pp. 100–107, (Proceedings).

Ser. No. 346,569, Zima (A. P. C.), published Apr. 20, 1943.